Sept. 3, 1929. T. K. STEVENSON 1,727,139
PISTON RING REMOVER
Filed Sept. 15, 1926
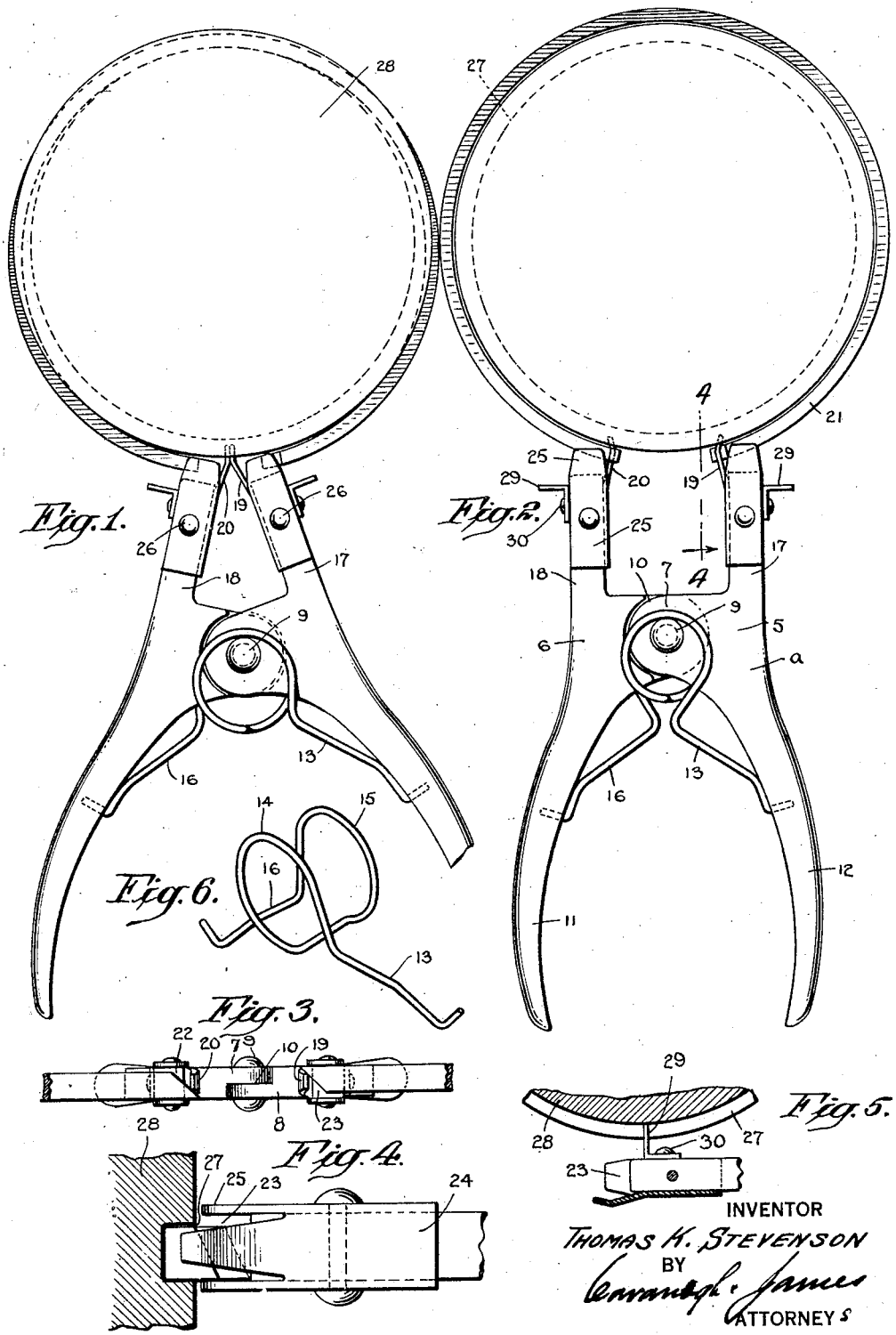

Patented Sept. 3, 1929.

1,727,139

UNITED STATES PATENT OFFICE.

THOMAS K. STEVENSON, OF NEW YORK, N. Y., ASSIGNOR TO FRANCIS VAN BLARCOM, OF NEW YORK, N. Y.

PISTON-RING REMOVER.

Application filed September 15, 1926. Serial No. 135,529.

The present invention relates to a tool or implement for use with the pistons of hydrocarbon motors for the purpose of connecting or disconnecting the piston rings.

The invention has for its general object to provide a tool which may be readily engaged by one hand and manipulated as a pliers to expand a piston ring and this without danger of permanently distorting the ring.

The invention primarily consists in a hand tool which may be manipulated to enter between the meeting ends of a piston ring, and easily operated by a squeeze of the hand to separate the said meeting ends of said ring.

The foregoing and other objects are accomplished by instrumentalities pointed out in the following specification and clearly defined in the claims.

A satisfactory embodiment of the invention is illustrated in the accompanying drawings in which Fig. 1 is a fragmentary plan view of the device in use with the jaws in closed position, Fig. 2 is a plan view also showing the device in use and the jaws thereof separated.

Fig. 3 is a detail front end elevation of the jaws positioned as shown in Fig. 2, the major portion of the ring being broken away to disclose the construction and arrangement of other parts, Fig. 4 is an enlarged detail side elevation taken approximately on the line 4—4 of Fig. 2 and looking in the direction of the arrows, Fig. 5 is a detail partly in plan and transsection showing the groove stroper in use; and Fig. 6 is a detail perspective of the spring.

In the drawings I have shown a hand tool having the general appearance of a pair of hand pliers. In the present instance it is to be noted that the shank portions 5 and 6 are not crossed at their points of connection as in ordinary pliers but are provided on their inner sides with laterally extending lugs 7 and 8, which are connected together by pivot pin 9, the lugs being recessed on their inner faces as shown at 10 in order that their outer faces may be in a common plane. The handle members 11—12 diverge from pivot pin 9, and are yieldingly held in the position shown in Fig. 1 by a spring 13 formed of a single length of wire and having centrally disposed spaced looped portions 14 and 15 arranged around opposite end portions of pivot pin 9, and diverging side portions 16 terminally connected, as shown, to the handle members 11 and 12. The jaw members 17 and 18 are continuations of the handle members 11 and 12 and by virtue of this construction the spring 13 operates to hold the jaw members bearing one upon the other and the separation of the jaw members is effected by manually squeezing the handle members.

Angular shaped tines or reduced portions 19 and 20 extend forwardly from the inner faces of the jaws 17—18. These tines are flat and relatively thin and are adapted for insertion between the meeting ends of a piston ring 21, as shown in Fig. 1. Sockets 22 and 23, are located outwardly beyond the tines and are adapted for cooperating with the tines to confine the meeting end portions of ring 21, and thereby prevent accidental disengagement of the tool from the ring when the tines are inserted between the meeting ends and handle members operated to separate the jaws.

In the present instance jaw members 17 and 18 are rectangular in cross section, and tines 20 and 21 are triangular shaped extensions of the inner side walls 24, of channelled clips 25 formed of sheet steel, and made to receive the jaws 17 and 18, to which they are suitably secured as by rivets 26. The clips are disposed so that end portions of their opposite sides extend beyond the ends of the jaws as indicated by 25 to provide the sockets 22 and 23 previously referred to.

The provision of the foregoing construction greatly simplifies and facilitates the operation of expanding a piston ring. It being obvious that when the tines are inserted between the meeting ends as shown in Fig. 1, the ring may be easily and expeditiously expanded to the size shown in Fig. 2, simply by exerting sufficient pressure with one hand, upon the handles to cause these to approach. In the operation of the tool it is to be noted that the jaws act to move the meeting ends of the ring simultaneously. This permits uniform expansion of the ring and prevents accidental permanent distortion thereof.

It is further proposed to adapt the tool of this invention to provide a means for conveniently scraping the ring grooves 27 of piston 28, by providing the angular shaped scraping blades 29 secured as by rivets 30 to the outer sides of the jaws, and adapting these blades to operate within the grooves as shown in Fig. 5.

From the foregoing it is to be noted that the tool of the present invention is of comparatively simple construction and may be manufactured at a minimum of cost. The several parts are of course susceptible of various changes, and I reserve the right to make such changes as may come within the scope of the appended claims.

What I claim is:

1. A hand tool for expanding piston rings comprising oppositely disposed jaw members and oppositely disposed diverting handle members forming continuations of the jaw members and connected for movement toward each other in outward movement of the jaw members, and channelled clips fitting over and secured to the jaw members, said clips each having parallel side portions extending beyond the free ends of the jaw members and a tapered tine lying between and projecting beyond the parallel side portions of the channelled clips, and adapted for insertion between the meeting ends of the piston ring.

2. A hand tool for expanding piston rings comprising oppositely disposed jaw members and oppositely disposed diverting handle members forming continuations of the jaw members and connected for movement toward each other in outward movement of the jaw members, and channeled clips substantially U-shaped in cross section fitting over and secured to the jaw members, each of said clips having parallel side portions projecting beyond the free ends of the jaw members, and a tapered intermediate tongue-like portion lying between the side portions and projecting beyond the ends of the latter, and adapted for insertion between the meeting ends of the piston ring.

Signed at New York city in the county of New York and State of New York this 8th day of September, A. D. 1926.

THOMAS K. STEVENSON.